US007688861B2

(12) United States Patent
Sidana (10) Patent No.: US 7,688,861 B2
(45) Date of Patent: Mar. 30, 2010

(54) MEDIA CHANNEL SWITCHING

(75) Inventor: Vikas Sidana, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 381 days.

(21) Appl. No.: 11/790,868

(22) Filed: Apr. 27, 2007

(65) Prior Publication Data

US 2008/0267210 A1 Oct. 30, 2008

(51) Int. Cl.
*H04J 1/00* (2006.01)
(52) U.S. Cl. ........................................ 370/486; 370/489
(58) Field of Classification Search ................. 370/389, 370/390, 473, 485, 486, 489
See application file for complete search history.

(56) References Cited

U.S. PATENT DOCUMENTS

| 6,714,264 | B1 | 3/2004 | Kempisty |
| 2004/0255328 | A1 | 12/2004 | Baldwin et al. |
| 2004/0264563 | A1* | 12/2004 | Inoue et al. ............ 375/240.01 |
| 2007/0107025 | A1* | 5/2007 | Li et al. ......................... 725/97 |
| 2007/0153820 | A1* | 7/2007 | Gould ......................... 370/432 |

FOREIGN PATENT DOCUMENTS

KR 10-2006-0115415 11/2006

OTHER PUBLICATIONS

International Search Report dated Sep. 25, 2008.
"Managing Delay in IP Video Networks, Version 1.0," Cisco Systems, 2005, pp. 1-14.
"Microsoft TV IPTV Edition," http://www.microsoft.com/tv/IPTVEdition.mspx.

* cited by examiner

*Primary Examiner*—Min Jung (57) ABSTRACT

The present invention discloses methods and systems for switching between media channels. Pursuant to these methods and systems, a broadcast source may provide multicast streams to client devices for presentation of media channels to a user. When a client device requests to switch channels, a client device that is receiving the requested channel initially transmits a unicast stream for the requested channel to the client device switching channels. The requesting client device upon receipt of this unicast stream may then provide the corresponding channel to the user.

20 Claims, 5 Drawing Sheets

MEDIA CHANNEL SWITCHING

BACKGROUND

1. Field of the Invention

The present invention relates generally to distributing media channels, and more particularly, to switching between media channels.

2. Related Art

Users of analog televisions are accustomed to rapidly switching between channels to choose different television programs. Traditionally, analog televisions are equipped with an internal tuner for switching channels that are received via over-the-air broadcast signals or cable television (CATV) signals. To switch channels, the internal tuner tunes to a different channel frequency and locks onto the signal. The television then processes the signal and displays the channel on a cathode ray tube (CRT) device, liquid crystal display (LCD), plasma screen, etc.

Sometimes a set-top box (STB) is used in conjunction with a television. In such systems, the STB includes an internal tuner that operates in a manner similar to that of a traditional internal tuner; that is, the STB tuner switches between channels by tuning to a new channel frequency and locking onto the signal. The STB then provides the desired channel to the television for display. STBs often employ additional hardware and/or software beyond that found in a traditional television such as, for example, a processor to decode scrambled premium channels.

More recently, television channels are also distributed over a packet switching network such as the Internet. This television distribution technology, referred to as Internet Protocol Television (IPTV) or video-over-IP, does not use different frequencies for each television channel. Rather, a different data stream is transmitted over the network for each television channel. The H.264 standard, also referred to as MPEG-4 AVC (Advance Video Control), is often used for transmitting data streams in IPTV. In the H.264 standard, a data stream comprises multiple groups of pictures ("GOP") each having an initial frame or intraframe ("I-Frame") followed by a series of associated consecutive delta or image frames ("Δ-Frame").

To begin viewing the data stream, an I-Frame must first be processed. Unfortunately, in typical systems when switching channels, before a user can begin viewing a channel, a user must wait until the broadcast source finishes transmitting the current GOP and transmits the I-frame of a new GOP. Such a delay is commonly several seconds, which is significantly longer than the delay associated with the switching of television channels in over-the-air or CATV systems. Such relatively greater delays to switch between channels may negatively impact adoption of IPTV.

SUMMARY

In one aspect of the present invention, a method for providing media channels to a user is disclosed, the method comprising: receiving, by a first client device, a first data stream transmitted by a broadcast source, the first data stream representing a first channel; processing the first data stream by the first client device; presenting the first channel to the user based on the processed first data stream; receiving, by the first client device, a request generated by a second client device to switch channels on the second client device from a second channel to the first channel; and transmitting, in response to the request, from the first client device to the second client device, a second data stream representing the first channel.

BRIEF DESCRIPTION OF THE DRAWINGS

Embodiments of the present invention are described below in conjunction with the accompanying drawings, in which.

DETAILED DESCRIPTION

Aspects of the present invention are generally directed to switching, upon a user's request, media channels distributed over a network. To reduce channel switching delays due to waiting to obtain an initial frame (e.g., I-frame) from the broadcast source for a requested channel, embodiments of the present invention obtain an I-frame generated from another user in the network that is currently receiving the data stream for the requested channel.

Figure 1:
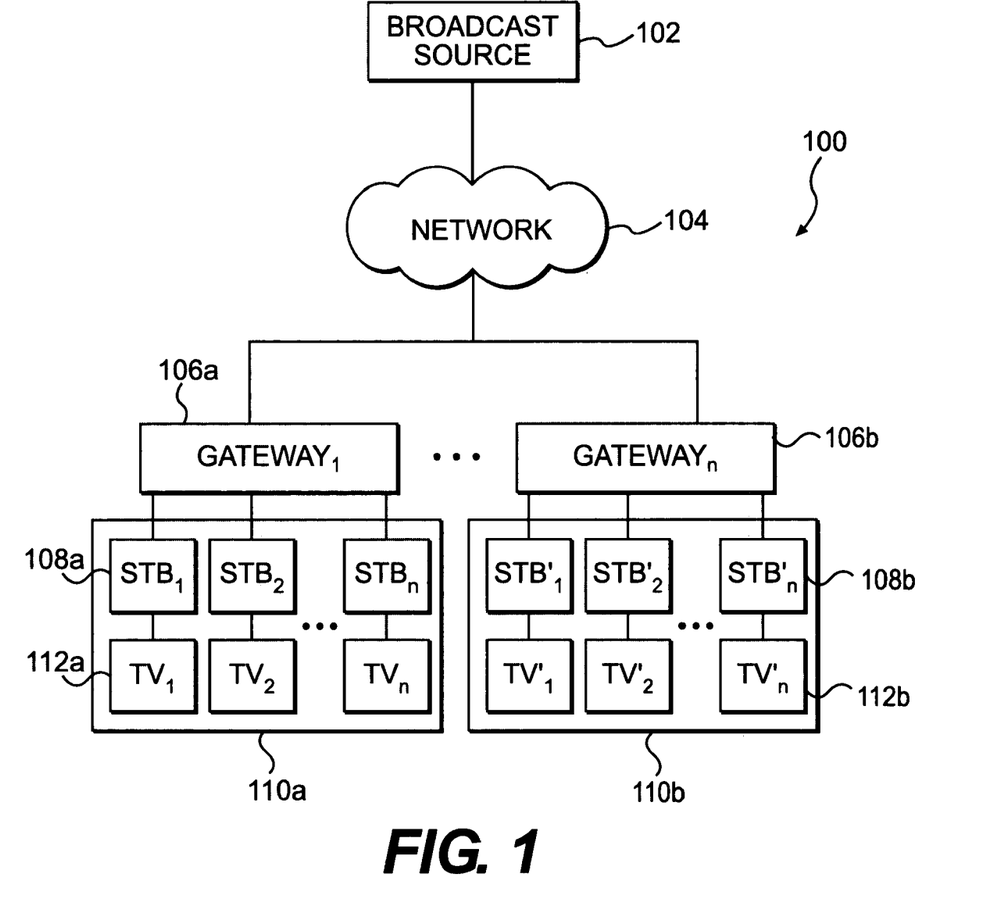
FIG. 1 is a block diagram of an exemplary broadcast network, in accordance with an embodiment of the present invention.

FIG. 1 illustrates an exemplary broadcast network 100 for broadcasting television channels in an Internet Protocol Television (IPTV) system, in accordance with an embodiment of the present invention. Although FIG. 1 will be described with reference to distributing television channels, embodiments of the present invention may also be useable in systems distributing other type of media content such as music. It should also be appreciated that although FIG. 1 is described with reference to distributing television channels over the Internet, other networks may be utilized in alternative embodiments of the present invention. Such networks include, for example, local area networks (LANs), metro area networks (MANs), other Wide Area Networks (WANs), wireless networks, or any combination thereof. Additionally, although the embodiment of FIG. 1 is described below with reference to IPTV, it should be understood that the present invention may be implemented in other types of systems including Internet radio or multimedia website on the Internet.

As used herein, a media channel refers to a collection of audio and/or visual content; that is, a collection of media content. Exemplary media channels may include music channels (e.g., Internet radio stations), multimedia channels, and/or television channels. A media channel for IPTV is a type of "virtual" television channel analogous to the television channels for CATV. In IPTV, however, each virtual channel is represented by a separate data stream. Further, in IPTV a media channel may be uniquely identified, such as by letters, numbers or a website address.

In broadcast system 100, a broadcast source 102 broadcasts one or more television channels to set top boxes (STBs) 108 connected to one or more gateways 106 via a network 104. Each gateway 106 connects several STBs 108 together in a neighborhood 110. Further, each STB 108 may individually receive a particular media channel, which the STB decodes to provide the media content in the media channel to a corresponding television 112 for viewing by a user.

Broadcast source 102 may be a distributor of a multicast stream for one or more media channels. Broadcast source 102 may include one more distribution servers, cables, satellites, other types of servers, switches, networks, etc. For example, in an embodiment employing IPTV, broadcast source 102 may comprise one or more video distribution servers for generating and multicasting data streams to STBs 108.

A multicast stream refers to a data stream that is provided from broadcast source 102 and capable of being received by one or more end-users. The media content for a particular media channel may be created by television stations, entertainment companies, or created from stored programs or movies. Further, the media content may be provided to broadcast source 102 as a feed and encoded, if necessary, into a digital format to generate the media channel and a corresponding multicast stream for broadcasting the media channel. For simplicity, broadcast system 100 is depicted in FIG. 1 as comprising a single broadcast source 102. It should be appreciated, however, that in alternative embodiments broadcast system 100 may comprise multiple broadcast sources 102, each of which may transmit one or more media channels via network 104.

As illustrated, both gateways 106a and 106b are connected to several STBs 108a and 108b, respectively. A gateway 106 serves as a network node, acting as an access point for STBs 108 in their respective neighborhood 110 to interface with network 104. In addition, gateways 106a, 106b each function as a router, switch, or hub to allow the connected STBs 108a and 108b, respectively, to communicate with each other. Although network 104 is depicted in FIG. 1 as comprising two gateways 106a, 106b, it should be appreciated that in other embodiments, other quantities and types of distribution nodes may be used as a common access point for a group of STBs 108. As used herein, the term distribution node refers to any device that provides a communication connection between two or more STBs 108 and also provides a communication connection to network 104. As one of ordinary skill in the art will appreciate, such a distribution node may in fact be implemented in more than one network node. For example, a conventional router may be used to provide a communication connection between STBs 108 while a conventional gateway may be used to provide a communication connection to network 104.

Although FIG. 1 is illustrated and will be discussed herein as including STBs 108, in other implementations, broadcast system 100 may include other types of client devices, in addition to or in place of STBs 108. As used herein the term "client device" refers to any type of device capable of receiving a media channel. For example, exemplary client devices may include STB 108, a television with an internal tuner, a digital video recorder, a display device, a computer, a cell phone, a portable television, or any other suitable electronic device that may decode a received stream and allow users to switch between media channels.

Network 104 may be any type of network such as the Internet, a local area network (LAN), a metro area network (MAN), or any combination thereof. Further, for simplicity, the various components, such as servers, routers, switches, etc., of network are 104 not illustrated in FIG. 1.

As illustrated, STBs 108a are each connected to a television 112a in neighborhood 110a, while neighborhood 110b comprises STBs 108b and corresponding televisions 112b. It should be appreciated that neighborhoods 110 may be defined by a fixed geographical area, such a street, sub-division, city block, town, etc. This geographical area may vary depending on the number and location of the client devices. Or, for example, neighborhood 110 may be a group of client devices that are connected to a common gateway regardless of physical location, and may be organized in some other manner, such as those subscribing to a particular service, those owned by a particular company, etc. Further, different neighborhoods 110 may have a different number of STBs 108 connected to the common gateway 106. Additionally, the number of client devices 108 connected to a particular gateway 106 may vary as new users in a neighborhood 110 are added and removed. Although FIG. 1 is illustrated such that all client devices are STBs, in other embodiments, a neighborhood 110 may include different types of client devices such as computers, televisions with internal tuners, cell phones, etc.

Televisions 112 may be passive devices for displaying images or videos to a user to view. Further, although broadcast network 100 is illustrated with reference to televisions, other types of displays may be used without departing from the invention. Exemplary devices for displaying images or videos may include plasma, LCD, CRT, projection displays, etc. that may or may not include an internal tuner.

Multicast streams sent from broadcast source 102 to STBs 108 may also comprise audio data in combination with image data. To provide sound to the user, television 112 may also comprise a speaker or audio output arrangement (not shown). STB 108 or television 112 may further be connected to a sound system or collection of speakers that provides sound to the user.

The following provides a more detailed exemplary operational description of how broadcast system 100 might be used to distribute media channels to users. As noted above, in operation, broadcast source 102 may transmit multicast streams of one or more corresponding media channels to STBs 108 via network 104. When a user of a particular STB 108 desires to view a particular channel, the user may direct the user's STB 108 to obtain the desired channel using, for example, a remote control, buttons located on the client device, or a graphical user interface (GUI) displayed on a display (e.g., television 112). In response, STB 108 may issue a request to receive the desired channel. This request may then be transmitted through gateway 106 to broadcast source 102 via network 104. In response, broadcast source 102 may then begin transmitting a multicast stream containing the requested channel to the user's STB 108. The STB 108 then processes the multicast stream, and forwards the resulting video to television 112 so that the user may view the desired channel.

In one embodiment, broadcast source 102 transmits a media channel to one or more STBs 108 via a multicast stream using a digital video compressor/decompressor (codec) such as a codec implementing the H.264 or MPEG-4 AVC (Advance Video Control) standard. As noted above, pursuant to the H.264 standard, a multicast stream for a video comprises a sequence of group of pictures ("GOP"), where each GOP comprises an initial frame or intraframe ("I-Frame") followed by a series of consecutive frames (also referred to herein as image frames or "Δ-Frames"). The Δ-Frames may include a predictive frame ("p-frame") or bidirectional frame ("b-frame"). Each GOP may have a fixed length with the same number of I-frames and Δ-frames. Alternatively, each GOP may be a variable length with different quantities of I-frames and Δ-frames.

Figure 2:
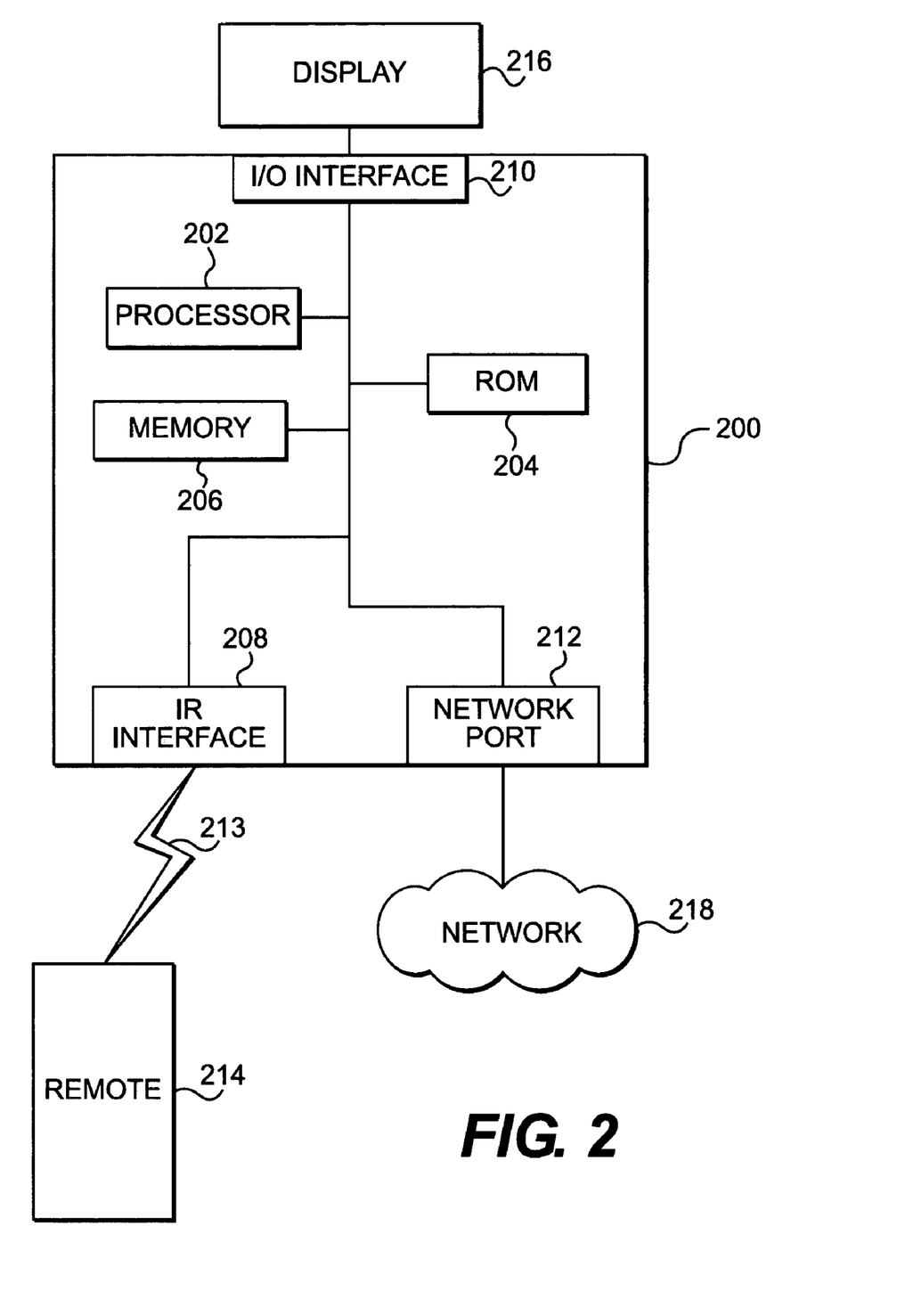
FIG. 2 is a functional block diagram of an exemplary client device, in accordance with an embodiment of the present invention.

FIG. 2 is a schematic block diagram of an exemplary client device 200 in accordance with one embodiment of the present invention. Client device 200 may be, an STB, such as STB 108 (FIG. 1), a computer, a digital video recorder, etc., as described above.

Client device 200 may include a central processing unit (CPU) 202, Read Only Memory (ROM) 204, and other memory 206 such as Random Access Memory (RAM) or flash memory, communicatively coupled together. Client device 200 may also include an infrared (IR) interface 208, an input/output (I/O) interface 210 and a network interface port 212. It should be noted that FIG. 2 is a simplified diagram and in actual implementation, client device 200 may include additional components including a hard disc drive, a floppy disc drive, an optical disc drive, etc.

IR interface 208 may receive IR signals 213 from a remote control 214 to enable a user to control client device 200 with remote control 214. Additionally, client device 200 may also include other user controls in addition to or in place of remote control 214. For example, in embodiments, a user may exercise control over client device 200 using other types of input devices including a personal digital assistant, a laptop computer, a keyboard, or a computer mouse connected to client device 200 using suitable wired or wireless radio frequency connections. Further, in embodiments, client device 200 may be connected to multiple input devices through an IR remote 214 and/or a control panel on client device 200 comprising one or more ports for connecting to input devices.

I/O interface 210 may be an interface for connecting client device 200 to a display 216. As noted above with reference to FIG. 1, display 216 may be a television such as televisions 112 of FIG. 1 or a computer monitor. In addition, I/O interface 210 may connect client device 200 to other audio/visual electronic equipment such as a personal computer, a video cassette recorder, an optical playback/recorder device, a digital video recorder, a camcorder, a digital camera, speakers, an amplifier, a receiver, a personal digital assistant, etc.

As illustrated, network interface port 212 connects client device 200 to network 218. Referring back to FIG. 1, network 218 of FIG. 2 may comprise gateways 110, network 104, and broadcast source 102 of exemplary broadcast network 100. In such an implementation, network interface port 212 may connect client device 200 to a gateway 110 either directly or indirectly, through one or more switches, routers, etc.

Network interface port 212 is connected to client device 200 to network 218 via a wireless connection, coaxial cable line(s), fiber optic line(s), a Digital Subscriber Line (DSL), telephone line(s), a satellite link, or a combination thereof. In addition to network port 212, in other embodiments, client device 200 may also include multiple additional network ports for connecting to other networks implementing different protocols. For example, in an embodiment, a client device may comprise both a network port implementing a LAN protocol (e.g., an Ethernet card) and a network port implementing a wireless protocol (e.g., a wireless card implementing a WIFI (IEEE 802.11) protocol).

As noted above with reference to FIG. 1, during channel switching, rather than an STB 108 waiting until broadcast source 102 transmits a new initial frame (e.g., I-frame) for a requested channel, the requesting STB 108 may initially obtain an initial frame (e.g., an I-frame) and one or more subsequent image frames (e.g., Δ-frames) for the new channel from another STB 108 connected to a common gateway 110. The servicing STB 108 may transmit this initial frame and subsequent image frames to the requesting STB 108 via a unicast stream. As used herein, the term unicast stream refers to a stream of data sent from one client device to at least one other client device.

Figure 3:
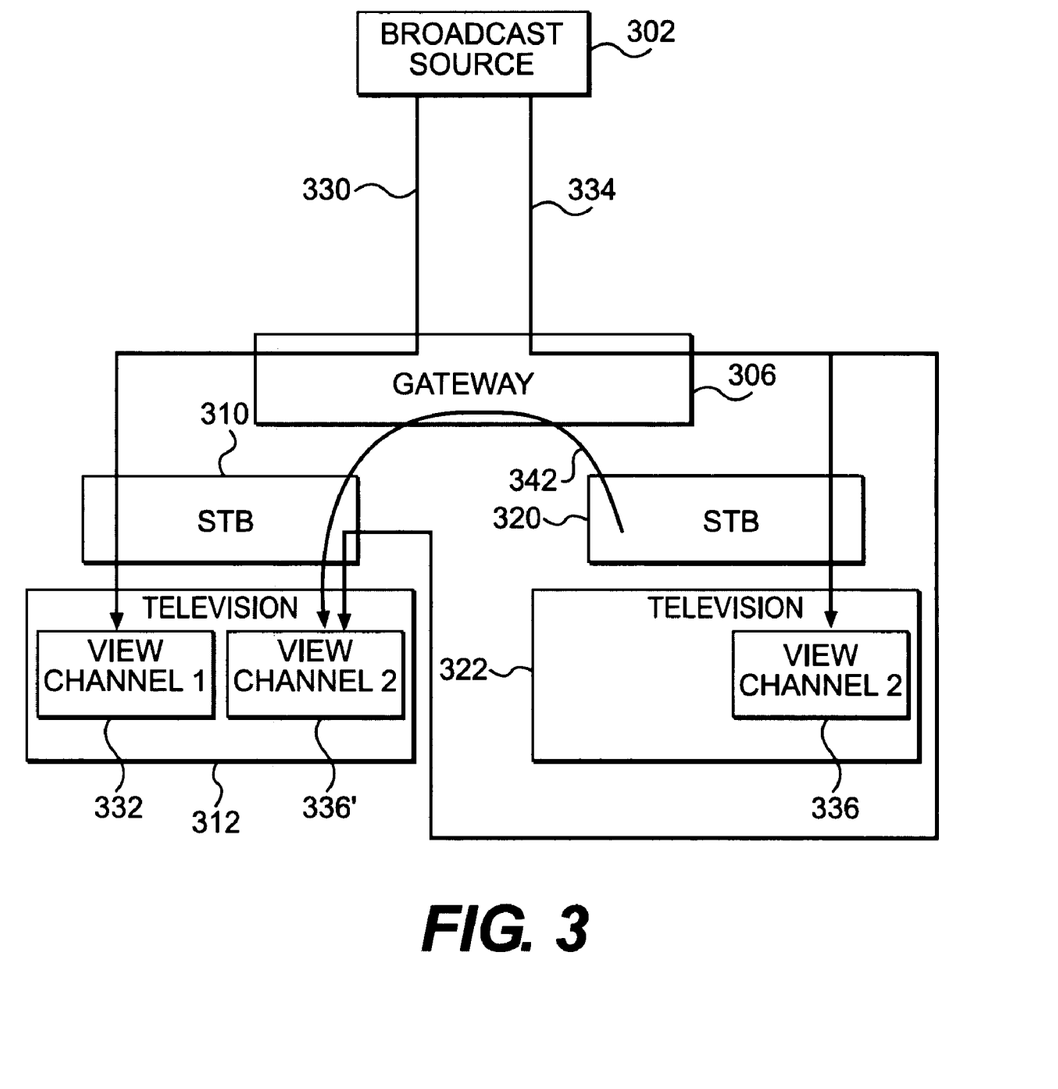
FIG. 3 is a simplified block diagram of an exemplary broadcast network, in accordance with an embodiment of the invention.

FIG. 3 is a functional diagram of a simplified broadcast network 300 for illustrating an exemplary embodiment of the present invention. For explanatory purposes, broadcast network 300, as illustrated, is a simplified version of broadcast system 100, and as shown includes a broadcast source 302, a gateway 306, and STBs 310 and 320. Further, as illustrated, STBs 310 and 320 are connected to televisions 312 and 322, respectively. Also illustrated are multicast streams 334 and 330 and unicast stream 342, which will be described in more detail below with reference to FIGS. 4A and 4B.

Figure 4A:
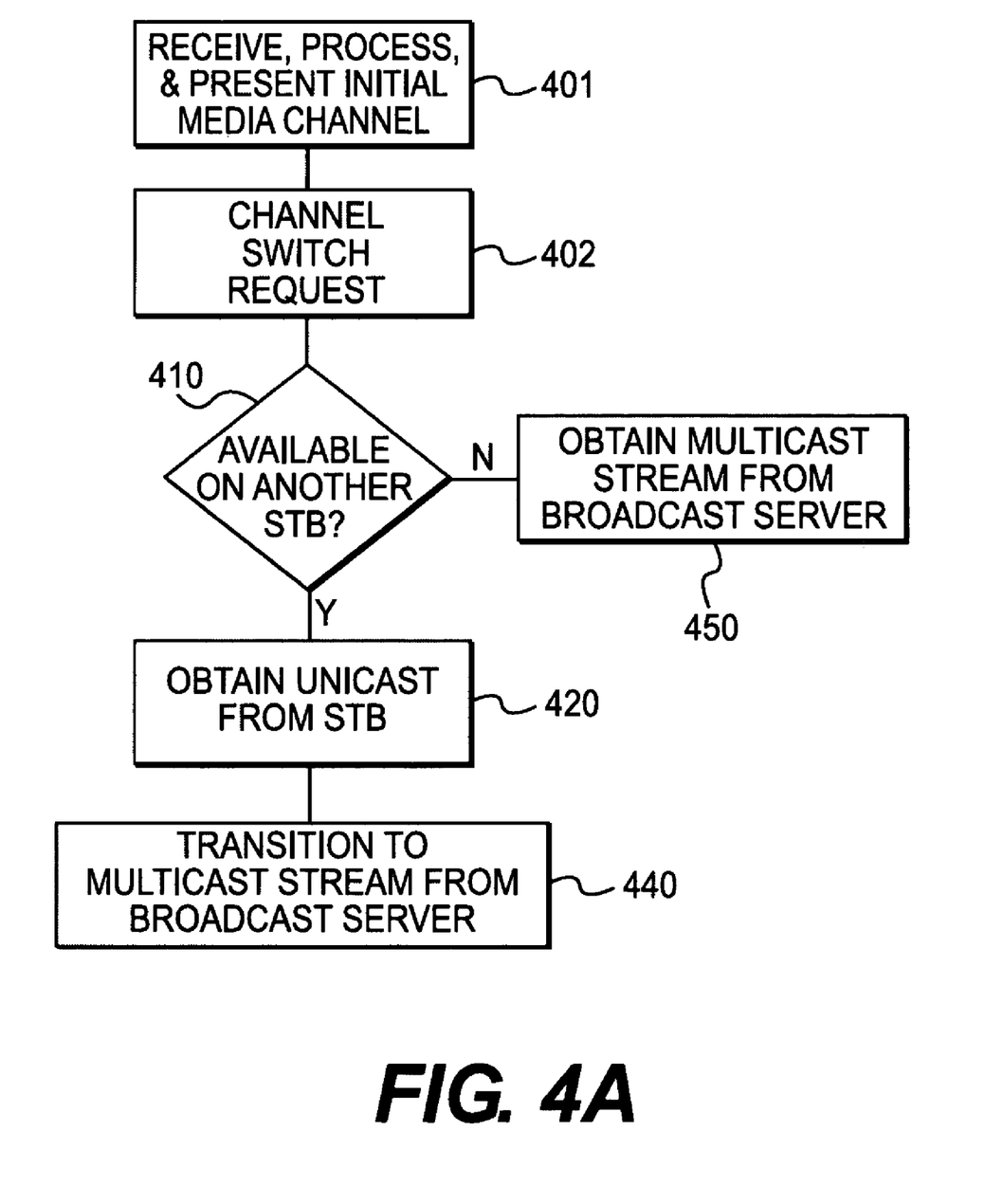
FIG. 4A is a top-level flowchart for switching media channels, in accordance with an embodiment of the present invention.

FIG. 4A is a top level flowchart of an exemplary method 400 for switching media channels, in accordance with an embodiment of the present invention. FIG. 4A is described with reference to broadcast network 300 (FIG. 3). In this example, broadcast source 302 initially transmits multicast streams 330 and 334 to STBs 310 and 320, respectively. Further, for exemplary purposes, in this example, multicast stream 330 and multicast stream 334 are television channel streams encoded by broadcast source 302 in accordance with a video encoding standard such as, for example, the H.264 video codec.

Initially, at step 401, STBs 310, 320 are each receiving, processing and presenting multicast streams 330, 334, and presenting the decoded media content to televisions 312, 322, respectively. For explanatory purposes, multicast stream 330 initially received by STB 310 will be referred to as "channel 1" 332 and multicast stream 334 initially received by STB 320 will be referred to as "channel 2" 336. Accordingly, initially, "channel 1" 332 and "channel 2" 336 are displayed on television 312 and television 322, respectively.

At step 402, STB 310 initiates a channel switch request to switch from channel 1 to channel 2. In response, STB 310 determines whether any STBs connected to gateway 306 are currently receiving channel 2 at decision block 410. If not, STB 310 obtains channel 2 from broadcast server 302 at step 450. If, however, an STB connected to gateway 306 is receiving the requested channel, STB 310 obtains a unicast stream 342 for the requested channel from the other STB at step 420. STB 310 then processes the received unicast stream 334 to display channel 2 336' on television 312 until STB 310 transitions, at step 440, to receiving and processing multicast stream 334 for channel 2 from broadcast server 302. It should be noted that FIG. 4A is a top level flow diagram illustrating how STB 310 may increase its channel switching speed by initially obtaining a unicast stream 342 for a requested channel from another STB connected to the same gateway 306 as STB 310. A more detailed description of the exemplary steps of FIG. 4A will be presented below.

Figure 4B:
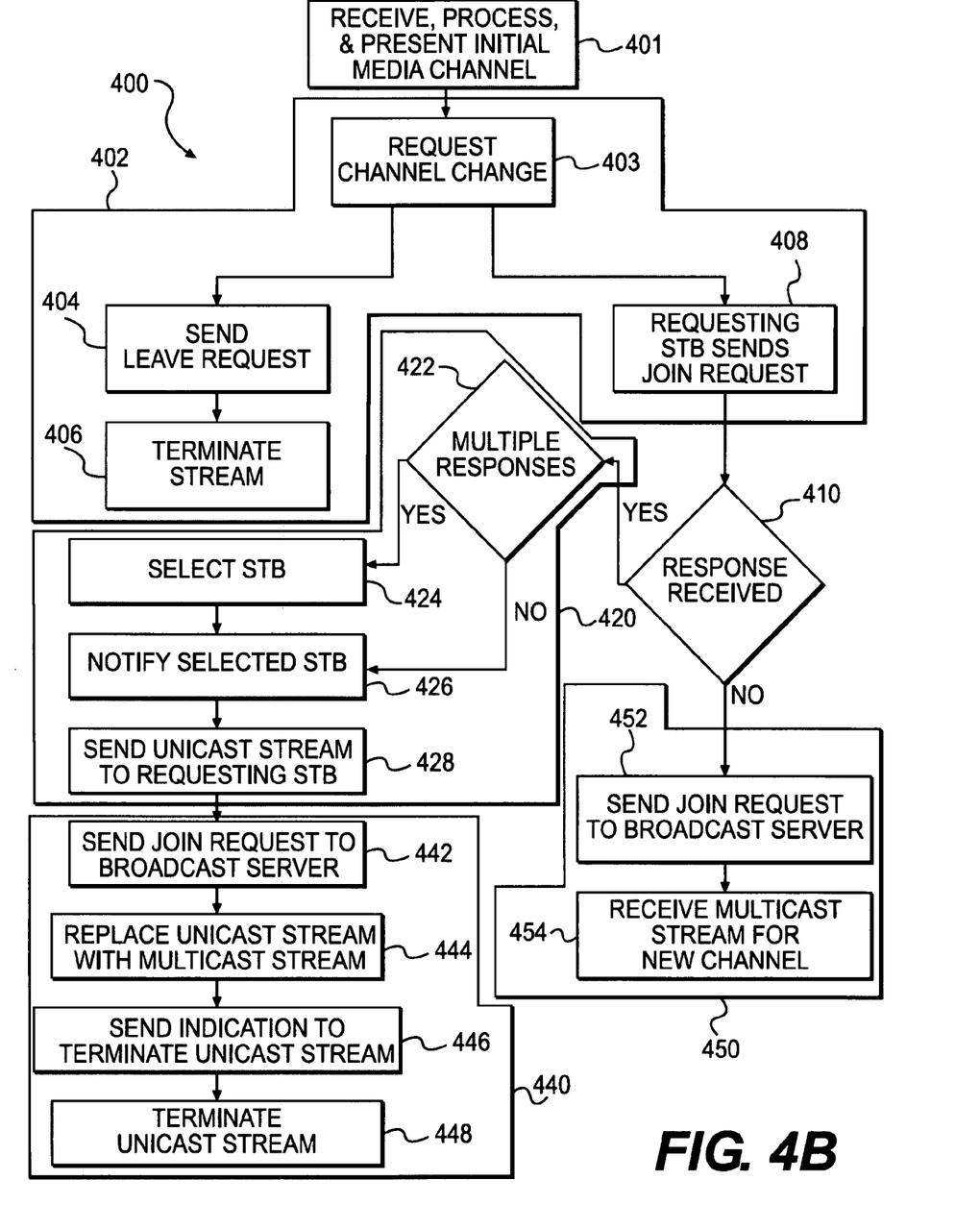
FIG. 4B is a more detailed flowchart for switching media channels, in accordance with an embodiment of the present invention.

FIG. 4B is a more detailed flowchart of exemplary method 400 for switching media channels in accordance with an embodiment of the present invention. FIG. 4B, like FIG. 4A, is described with reference to broadcast network 300 (FIG. 3). As noted above, initially, at step 401, STBs 310, 320 are each receiving, processing and presenting multicast streams 330, 334, and presenting the decoded media content to televisions 312, 322, respectively.

At step 402, STB 310 initiates a channel switch request to switch from channel 1 to channel 2. As illustrated, step 402 may comprise a user of STB 310 initiating a request to switch channels from channel 1 to channel 2, at step 403. In response, at step 408, STB 310 transmits a join request to gateway 306, which then broadcasts the request to all other STBs connected to gateway 306. In response, all STBs that are currently receiving the requested channel from broadcast source 302 send an acknowledgment to STB 310 via gateway 306 indicating that the STB(s) is/are currently receiving the requested channel. For example, because in the presently described embodiment STB 320 is receiving the requested channel 2, STB 320 sends an acknowledgment to STB 310 in response to STB 310's request.

Concurrently with STB 310 sending the join request at step 408, STB 310 may, at step 304, transmit a leave request to broadcast source 302 via gateway 306. In response, at step 406, broadcast source 302 terminates transmitting the existing multicast stream 330 to STB 310. As such, in the present embodiment, broadcast source 302 need only send to STB 310 one multicast stream at a time, which may accordingly offer improved network bandwidth usage over techniques in which channel switching is accomplished by a broadcast source simultaneously sending two or more multicast streams to STB 310.

At decision block 410, STB 310 determines whether the requested channel (i.e., channel 2) is being received by another STB connected to gateway 106, as noted above. This may be accomplished by, for example, STB 310 determining if it has received any responses from STBs indicating that they are currently receiving the requested channel. If so, STB 310 obtains a unicast stream from such other STB at step 420, as noted above.

As illustrated, step 420 may comprise STB 310 determining at block 422 whether multiple STBs are viewing the requested channel. If so, at block 424, STB 310 selects one of the responding STBs that are currently receiving the requested channel. STB 310 may use various techniques for selecting a particular STB including selecting the STB receiving the channel with the greatest available bandwidth, greatest processing power, etc. Or, for example, in one embodiment in which STBs are connected to gateways via one or more components or networks, STB 310 may select the STB receiving the channel for which there is the least amount of network latency between the STB and gateway 306. Referring back to step 410, if, however, STB 310 receives only one acknowledgement from one STB, it accordingly selects that STB.

Once a particular, STB is selected to service STB 310's channel switch request, STB 310 may send an indication to the selected STB at step 426 to notify the selected STB that it is to provide STB 310 with a unicast stream for the requested channel. For exemplary purposes, in the present description STB 320 is assumed to be the selected STB.

In response to the received indication, at step 428, STB 320 composes an I-frame from multicast stream 334 received by broadcast source 302 and begins sending a unicast stream 342 to STB 310 for the requested channel. As noted above, this generated and transmitted unicast stream 342 may comprise a sequence of GOPs each of which includes an I-frame followed by a series of Δ-frames. The I-frame for unicast stream 342 may be generated by STB 320 using various techniques. For example, STB 320 may compose the I-frame based on the video image it is currently sending to television 344 using standard techniques used for generating an I-frame for an image (e.g., a video image). Or, for example, STB 320 may store in its storage device a received I-frame and subsequent Δ-frames, and generate an I-frame from this stored data stream. Upon receipt of unicast stream 342 from STB 320, STB 310 processes the received unicast stream 342 to display channel 2 336's on television 312, such that television 312 displays channel 2 336' instead of channel 1 332. STB 310 may continue to receive and process unicast stream 342 until, for example, STB 310 transitions over to receiving and processing multicast stream 334 at step 440.

As illustrated, in the present example, step 440 may comprise STB 310, at step 442, transmitting a join request to broadcast source 302 via gateway 306 requesting that broadcast source 302 begin transmitting the multicast stream 334 for channel 2 to STB 310. It should be noted that the flow chart of FIG. 4 is exemplary only, and that the exemplary join request transmitted during step 442 may be transmitted at other times in other embodiments without departing from the invention. For example, in an embodiment, this join request may be sent concurrently with or combined with the leave request of step 404 and/or transmitted concurrently with the join request of step 408.

STB 310 continues to receive unicast stream 342 from STB 320 until STB 310 receives multicast stream 334 from broadcast source 302 at step 444. STB 310 then stops processing unicast stream 342 and switches over to processing multicast stream 334 to generate the images for channel 2 336' displayed by television 312. Further, STB 310 may concurrently with switching over to processing multicast stream 334, send an indication, at step 446, to STB 320 via gateway 306 that STB 320 may terminate its transmission of unicast stream 342 to STB 310. In response to receiving this indication, STB 320, at step 448, may terminate its transmission of unicast stream 342 to STB 310 and the channel switching process may terminate.

Returning to decision block 410, if STB 310 does not receive any acknowledgments from any STB indicating the STBs are receiving the requested channel, STB 310 obtains the multicast stream for the requested channel (i.e., multicast stream 334) from broadcast source 302, at step 450, as noted above.

Step 450 may comprise STB 310 transmitting a join request to broadcast source 302 to obtain multicast stream 334 for the requested channel at step 452. Broadcast source 302, in response, transmits multicast stream 334 to STB 310, which, at step 454, is received by STB 310. STB 310 then processes the received multicast stream 334 and displays the resulting video (i.e., channel 2 336') on television 312. The process may then terminate.

As discussed above, it should be noted that the flow chart of FIG. 4 is exemplary only and steps illustrated therein may be performed in a different order or steps may be combined without departing from the present invention. For example, rather than waiting until step 452 to send the join request of step 452, in other embodiments this join request may be sent concurrently with or combined with other requests, such as the join request of step 408 or the leave request of step 404.

Embodiments of the present invention are well suited to being scaled because as the number of client devices connected in each neighborhood increases, the chances of finding a client device already receiving a requested media channel increases.

Although in the embodiment discussed above with reference to FIGS. 3 and 4 unicast stream 342 is only sent by STB 310 to STB 320, in other embodiments, unicast stream 342 may also be sent and received by other client devices requesting to switch to the same channel. Or, for example, in other embodiments, multiple unicast streams may be composed and sent from one client device to each client device requesting to switch to the channel.

Although the present invention has been fully described in conjunction with several embodiments thereof with reference to the accompanying drawings, it is to be understood that various changes and modifications may be apparent to those skilled in the art. For example, it should be appreciated by one of ordinary skill in the elements described above with reference to functional block diagrams may comprise more or less components than those illustrated or described, and that the functional divisions described herein are conceptual only and are provided to facilitate understanding of embodiments of the present invention. Such functional allocations, therefore, should not be construed as limiting in any way. Such changes and modifications are to be understood as included within the scope of the present invention as defined by the appended claims, unless they depart therefrom. It should be noted that although FIG. 3 is discussed with reference to STBs 310 and 320, other types of client devices, such as those discussed above may be used without departing from the present invention. The present embodiments are, therefore, to be considered in all respects as illustrative and not restrictive.

All documents, patents, journal articles and other materials cited in the present application are hereby incorporated by reference.

What is claimed is:

1. A method for providing media channels comprising:
   receiving, by a first client device, a first data stream transmitted by a broadcast source, the first data stream representing a first channel;
   processing the first data stream by the first client device that is connected to a first display device;
   presenting the first channel to the first display device based on the processed first data stream;
   receiving, by the first client device, a request generated by a second client device that is connected to a second display device, wherein the request is generated by the second client device in response to a switch of channels at the second client device from a second channel to the first channel; and
   transmitting, in response to the request, from the first client device to the second client device, a second data stream representing the first channel, wherein the second data stream is for display by the second display device.

2. The method of claim 1, further comprising:
   generating, by the first client device, at least one initial frame for the first channel; and
   wherein transmitting the second data stream representing the first channel comprises transmitting the at least one generated initial frame.

3. The method of claim 2, further comprising:
   terminating the transmission of the second data stream from the first client device to the second client device in response to the second client device receiving a third data stream representing the first channel from the broadcast source.

4. The method of claim 1, wherein the first data stream comprises an initial frame and a plurality of consecutive frames associated with the initial frame, and wherein transmitting, by the first client device, the second data stream representing the first channel to the second client device, comprises:
   transmitting the initial frame and the plurality of consecutive frames associated with the initial frame in the second data stream.

5. The method of claim 1, further comprising:
   transmitting, by the second client device, a request to leave the second channel.

6. The method of claim 1, wherein transmitting, by the first client device, the second data stream comprises:
   transmitting the second data stream to the second client device via a distribution node.

7. The method of claim 6, wherein a plurality of client devices are connected to the distribution node, the method further comprising:
   determining, by the second client device, that the first client device is receiving the first data stream.

8. The method of claim 7, further comprising:
   receiving, by a third client device, the first data stream from the broadcast source representing the first channel;
   determining, by the second client device, that the third client device is receiving the first data stream, wherein the first client device and the third client device each has an associated network latency; and
   selecting, by the second client device, the first client device to which the request is to be sent in response to determining that the network latency for the first client device is less than the network latency for the third client device.

9. The method of claim 1, wherein the first client device has an I/O interface connected to the first display device, and the second client device has an I/O interface connected to the second display device.

10. The method of claim 1, wherein the first client device has an interface to receive user commands from a first remote control device, and the second client device has an interface to receive user commands from a second remote control device.

11. A first client device for providing a media channel to a user comprising:
    a first interface to connect to a first display device:
    a network interface configured to receive a first data stream representing a first channel from a broadcast source and to receive a request from a second client device that is connected to a second display device, wherein the request is responsive to a switch at the second client device from a second channel to the first channel; and
    a processor configured to process the first data stream to display the first channel at the first display device, and to transmit a second data stream representing the first channel to the second client device in response to the request.

12. The first client device of claim 11, wherein the processor is further configured to generate at least one initial frame for the first channel, and wherein in transmitting the second data stream the processor is configured to transmit the at least one generated initial frame to the second client device.

13. The first client device of claim 11, further comprising an infrared interface to receive user commands over infrared signals from a remote control.

14. A system for providing a media channel to a user comprising:
    at least one broadcast source configured to transmit a first data stream representing a first channel and a second data stream representing a second channel,
    a distribution node connected to the at least one broadcast source,
    a first client device and second client device each connected to the distribution node,
    the first client device comprising an interface configured to receive the first data stream, and a processor configured to process the first data stream to display the first channel at a first display device for connection to the first client device; and
    the second client device comprising an interface configured to receive the second data stream, and a processor configured to process the second data stream to display the second channel at a second display device for connection to the second client device, and to transmit a request in response to a switch from the second channel to the first channel at the second client device,
    wherein the processor of the first client device is further configured to receive the request from the second client device and transmit a third data stream representing the first channel to the second client device in response to the request from the second client device.

15. The system of claim 14, wherein the distribution node is configured to transmit a fourth data stream representing the first channel to the second client device; and wherein the processor of the first client device is configured to terminate the transmission of the third data stream representing the first channel in response to receiving an indication that the distribution node is providing the fourth data stream representing the first channel to the second client device.

16. The system of claim 14, wherein the processor of the second client device is further configured to transmit a request to leave the second channel.

17. The system of claim 14, further comprising:
   at least one additional client device connected to the distribution node; and
   wherein the processor of the second client device is further configured to determine whether the at least one additional client device connected to the distribution node is receiving the first channel, and in response to determining that the at least one additional client device is receiving the first channel, to select from among the client devices receiving the first channel a client device to which the request is sent.

18. The system of claim 14, wherein each of the first and second client devices has a respective infrared interface to receive user commands over infrared signals from a respective remote control.

19. A first client device, comprising:
   a first interface for connection to a first display device;
   a network interface to receive a first data stream carrying content of a first channel from a broadcast source;
   a processor configured to:
      process the first data stream to display the content of the first channel on the first display device;
      receive a request from a second client device responsive to channel switching from a second channel to the first channel at the second client device;
      in response to the request, transmitting a second data stream carrying the content of the first channel to the second client device to display the content of the first channel on a second display device connected to the second client device; and
      receive an indication from the second client device to terminate transmission of the second data stream, wherein the indication is responsive to the second client device receiving, from another source, another data stream carrying content of the first channel; and
      in response to the indication, terminate transmission of the second data stream to the second client device.

20. The first client device of claim 19, wherein the first data stream comprises an initial frame and a plurality of consecutive frames associated with the initial frame, and wherein the processor is configured to transmit the second data stream by:
   transmitting the initial frame and the plurality of consecutive frames associated with the initial frame in the second data stream.

* * * * *

UNITED STATES PATENT AND TRADEMARK OFFICE
CERTIFICATE OF CORRECTION

| | |
|---|---|
| PATENT NO. | : 7,688,861 B2 |
| APPLICATION NO. | : 11/790868 |
| DATED | : March 30, 2010 |
| INVENTOR(S) | : Vikas Sidana |

It is certified that error appears in the above-identified patent and that said Letters Patent is hereby corrected as shown below:

In column 10, line 16, in Claim 11, delete "device:" and insert -- device; --, therefor.

Signed and Sealed this

Fourteenth Day of September, 2010

David J. Kappos
*Director of the United States Patent and Trademark Office*